(12) United States Patent
Hellander et al.

(10) Patent No.: US 10,454,827 B2
(45) Date of Patent: Oct. 22, 2019

(54) METHOD AND DEVICES FOR CONTROLLING USAGE OF MULTI-PATH TCP

(71) Applicant: TELEFONAKTIEBOLAGET LM ERICSSON (PUBL), Stockholm (SE)

(72) Inventors: Bo Hellander, Täby (SE); Elinor Aminoff, Sollentuna (SE); Christofer Lindheimer, Linköping (SE); Martin Skarve, Enebyberg (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 15/311,134

(22) PCT Filed: May 15, 2014

(86) PCT No.: PCT/SE2014/050595
§ 371 (c)(1),
(2) Date: Nov. 14, 2016

(87) PCT Pub. No.: WO2015/174901
PCT Pub. Date: Nov. 19, 2015

(65) Prior Publication Data
US 2017/0085484 A1 Mar. 23, 2017

(51) Int. Cl.
*H04L 12/801* (2013.01)
*H04L 29/06* (2006.01)
(Continued)

(52) U.S. Cl.
CPC .............. *H04L 47/12* (2013.01); *H04L 47/11* (2013.01); *H04L 69/14* (2013.01); *H04L 69/16* (2013.01);
(Continued)

(58) Field of Classification Search
CPC ......... H04L 47/12; H04L 47/11; H04L 69/14; H04L 69/16; H04L 69/22; H04W 28/0205; H04W 24/08; H04W 80/06
See application file for complete search history.

(56) References Cited

U.S. PATENT DOCUMENTS

| | | | |
|---|---|---|---|
| 2015/0215922 A1* | 7/2015 | Bahk ....................... | H04L 47/14 370/235 |
| 2015/0245409 A1* | 8/2015 | Medapalli ............. | H04W 76/20 370/329 |

FOREIGN PATENT DOCUMENTS

| | | |
|---|---|---|
| GB | 2399712 A | 9/2004 |
| WO | 2011101425 A1 | 8/2011 |
| WO | 2014044333 A1 | 3/2014 |

OTHER PUBLICATIONS

Chadchan, et al., Priority-Scaled Preemption of Radio Resources for 3GPP LTE Networks, International Journal of Computer Theory and Engineering, vol. 3, No. 6, p. 743-749, Dec. 2011.
(Continued)

*Primary Examiner* — Pao Sinkantarakorn
*Assistant Examiner* — Kabir U Jahangir
(74) *Attorney, Agent, or Firm* — Sage Patent Group (57) ABSTRACT

A method performed by a network element in a communication network comprises inspecting traffic between a radio device and the communication network. The method also comprises, based on said inspecting, determining that the traffic is part of a TCP subflow of an MPTCP connection. The method also comprises, based on said inspecting, calculating a ratio of how much data is transmitted in the subflow in relation to the total amount of data transmitted in the MPTCP connection over a predetermined time period. The method also comprises observing that the calculated ratio is below a reference ratio. The method also comprises,
(Continued)

based on said observing, performing an action for preventing congestion in the communication network.

10 Claims, 6 Drawing Sheets

(51) Int. Cl.
    *H04W 80/06*    (2009.01)
    *H04W 24/08*    (2009.01)
    *H04W 28/02*    (2009.01)

(52) U.S. Cl.
    CPC ....... *H04W 24/08* (2013.01); *H04W 28/0205* (2013.01); *H04W 80/06* (2013.01); *H04L 69/22* (2013.01)

(56) References Cited

OTHER PUBLICATIONS

Ford, et al., TCP Extensions for Multipath Operation with Multiple Addresses, RFC 6824, Jan. 2013.

\* cited by examiner

Prior Art

Prior Art

METHOD AND DEVICES FOR CONTROLLING USAGE OF MULTI-PATH TCP

This application is a 371 of International Application No. PCT/SE2014/050595, filed May 15, 2014, the disclosure of which is fully incorporated herein by reference.

TECHNICAL FIELD

The present disclosure relates to methods and devices for preventing congestion in a communication network serving a multi-path transmission control protocol (MPTCP) capable radio device.

BACKGROUND

Many hosts today are multi-homed. Hence, they have multiple paths for connectivity via one or more access technologies. Regular Transmission Control Protocol (TCP)/Internet Protocol (IP) communications restrict these multi-homed hosts to use only one of the available interfaces/paths per session, where a path is defined as an (source, destination) IP address pair. The Internet Engineering Task Force (IETF) is currently looking into a mechanism which uses multiple paths between the communicating peers simultaneously during a communication session. Request for Comments (RFC) 6824 proposes a set of extensions to traditional TCP for multipath operations when multiple addresses are available. This is referred to as 'Multipath TCP' (MPTCP).

Advantages of using multiple paths concurrently are: i) improved network resource utilization (e.g., increased bandwidth due to resource pooling); ii) improved user experience through higher throughput; iii) allows failover from one interface to another (e.g., mobile client); and iv) allows a single data connection to use several interfaces simultaneously. A usage scenario for MPTCP is illustrated in FIG. 1.

Figure 1:
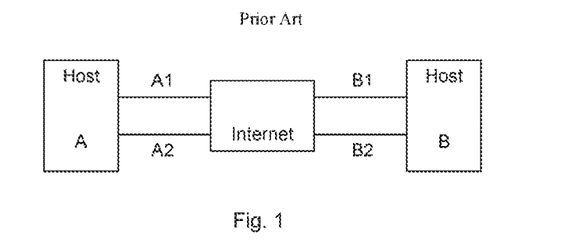
FIG. 1 illustrates two multi-homed hosts.

As shown in FIG. 1, two communicating hosts, host A and host B, are multi-homed and multi-addressed. Each host provides two separate connections to the Internet offering four different paths between them (A1-B1, A1-B2, A2-B1 and A2-B2).

A traditional TCP connection between the hosts A and B will make use of only one of the available paths whereas an MPTCP connection makes use of all the four available paths between hosts A and B. An "MPTCP connection" is similar to a regular TCP connection and is defined in RFC 6824 as: "a set of one or more subflows, over which an application can communicate between two hosts". A subflow is defined in RFC 6824 as: "A flow of TCP segments operating over an individual path, which forms part of a larger MPTCP connection". A subflow is started and terminated similar to a regular TCP connection. A TCP subflow may be called an MPTCP subflow when forming part of an MPTCP connection.

MPTCP is an end-to-end protocol which requires both hosts to support MPTCP (i.e., it requires both hosts to have an MPTCP protocol stack that includes an MPTCP protocol layer on top of one or more TCP/IP stacks) to benefit from MPTCP. Since, MPTCP is still in its early stage of deployment, probabilities that every host on the Internet supports MPTCP are very low. To overcome this problem and benefit from MPTCP even though both communicating hosts do not support MPTCP, an MPTCP proxy (a proxy server) may be used to convert MPTCP connections to TCP and vice versa.

Figure 2:
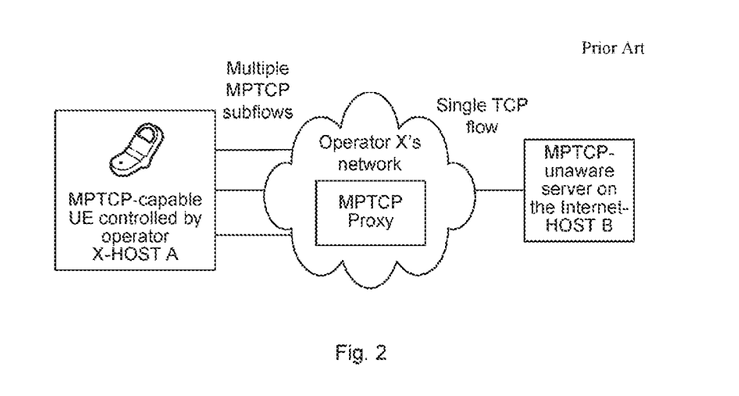
FIG. 2 illustrates the use of an MPTCP proxy.

One use case is illustrated in FIG. 2, in which an MPTCP-capable user equipment (UE, Host A) is controlled by the operator and sets up several MPTCP subflows to the MPTCP proxy placed in the telecommunications operator's network. This proxy in turn sets up a single TCP flow to a server on the Internet (Host B) which is not MPTCP capable. In the described scenario, the UE which supports MPTCP can still get the benefits of MPTCP although the server at the other end is not aware of MPTCP. It may be noted that a proxy may be used even if both end-points (i.e. also the server in this case) are MPTCP capable and MPTCP is run on both sides of the proxy.

So the main principle of Multi-Path TCP (MPTCP) is to aggregate a set of TCP connections, for example over different wireless interfaces such as in accordance with a third generation partnership project (3GPP) communication standard and a wireless local area network (WLAN, e.g. Wi-Fi) communication standard (or even different simultaneous 3GPP accesses). As the multiplexing of different connections is on TCP level, it allows separate congestion control for each subflow.

Figure 3:
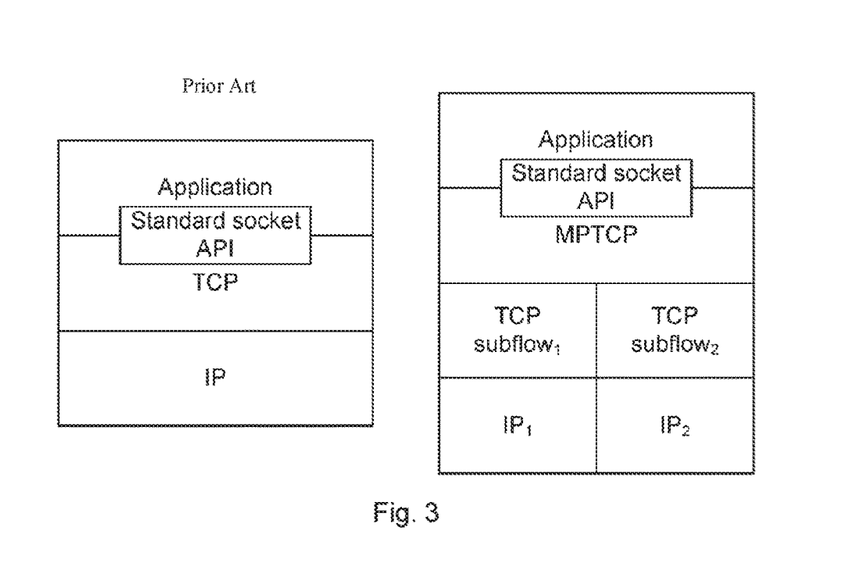
FIG. 3 illustrates a TCP/IP protocol stack and an MPTCP protocol stack.

FIG. 3 shows the differences between standard TCP and MPTCP protocol stacks. The application interface i.e. the socket application programming interface (API) is unchanged and the main changes are between this API and the IP-layer.

Figure 4:
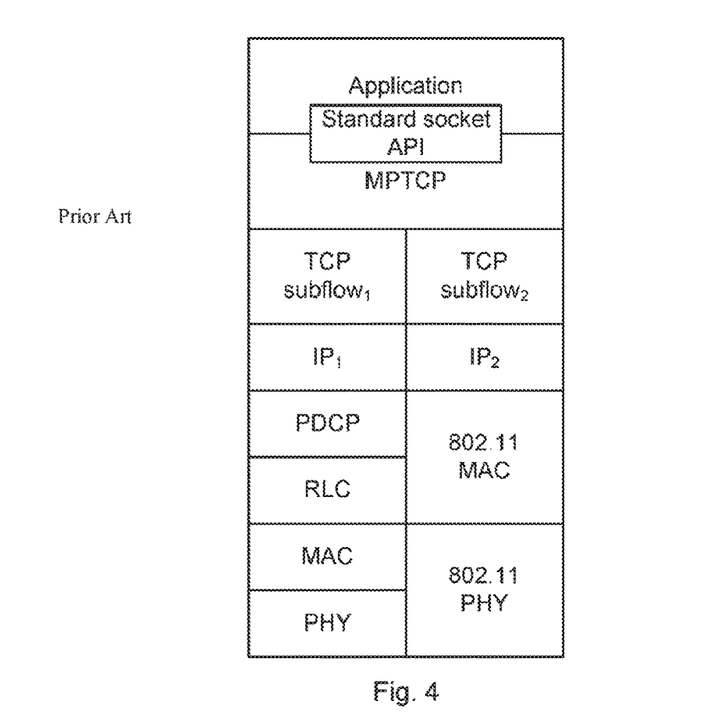
FIG. 4 illustrates an example MPTCP protocol stack.

MPTCP provides the possibility to fully and maximally utilize the different TCP subflows. For example, in the case of one TCP subflow on a 3GPP access and another one on Wi-Fi access, the total throughput could be the sum of these subflows. FIG. 4 shows a user plane protocol architecture example for the case when MPTCP would be utilizing a 3GPP long term evolution (LTE) communication standard and WLAN/Wi-Fi simultaneously.

Figure 5:
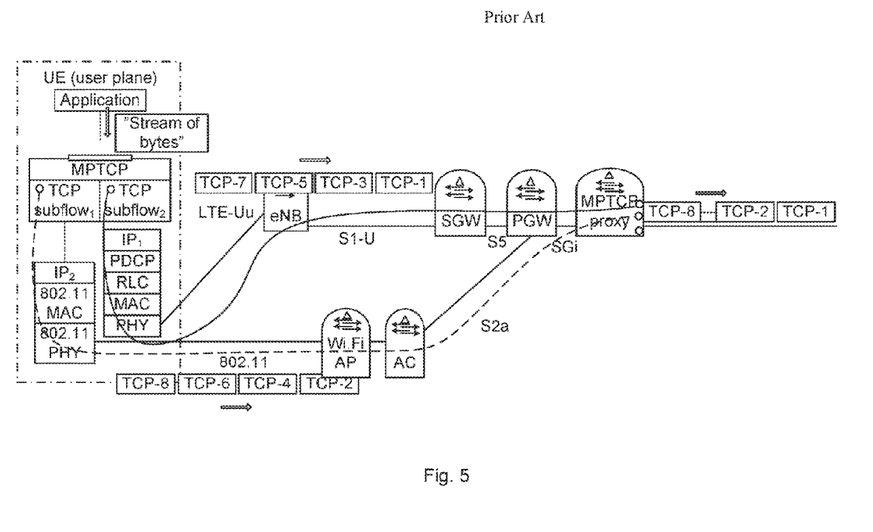
FIG. 5 illustrates MPTCP in action.

FIG. 5 shows an example case of MPTCP in action when the UE is simultaneously connected to both LTE and Wi-Fi/WLAN. The application in the UE has opened up one TCP socket and is sending a stream of bytes on the internal API. The MPTCP layer (also called MPTCP scheduler) has established two different TCP subflows, subflow 1 via WLAN/Wi-Fi (the curved dashed line) and subflow 2 via LTE (the curved solid line). Both these subflows are in this example towards an MPTCP Proxy that further communicates with another server using plain TCP (shown as a TCP connection to the far right in the figure). The MPTCP scheduler is the function that decides how the different packets are mapped to the two subflows. In this example, the MPTCP scheduler is applying "round-robin" scheduling i.e. a first TCP segment is sent on subflow 2, a second on subflow 1, a third again on subflow 2 etc. Another example is that MPTCP scheduler uses the subflow with the shortest round-trip time (RTT). Such an approach is typically used in today's MPTCP kernel prototype implementations.

Either of the hosts in an MPTCP communication may request that a subflow is only used as backup, and thus only used if other subflows fail. This is typical in the case when MPTCP is only used for "seamless session continuity at mobility" (e.g. the case of failover from one interface to another) and has been described as being done by sending a SYN flag in the MP_JOIN option when a new TCP subflow is added to a MPTCP connection, including four bits, three of which are currently reserved and must be set to zero by the sender. The final bit, labelled "B", indicates whether the sender wishes this subflow to be used as a backup path (B=1) in the event of failure of other subflows, or whether it wants it to be used as part of the connection immediately. By setting B=1, the sender is requesting the other host to only send data on this subflow if there are no available subflows where B=o. The "B" bit can also be updated dynamically for an established TCP subflow of an MPTCP connection using the MP_PRIO option.

The current MPTCP implementations available in devices (e.g., end user devices (e.g. UE), servers, and other devices) only utilize the "seamless session continuity at mobility" benefit of MPTCP, i.e. throughput aggregation is not used. The main reason for this is the fact that WLAN access is currently seen as a cheaper access compared to 3GPP accesses and therefore a preference for using WLAN/Wi-Fi (a.k.a., the "use Wi-Fi if available" preference) is currently also used in the context of MPTCP.

However, throughput aggregation will likely be used in the future, e.g. with concurrent MPTCP subflows over both WLAN and 3GPP accesses. Neither the WLAN nor the cellular 3GPP networks will then be aware that the traffic sent over it is sent over an MPTCP connection with a plurality of subflows. The respective networks are thus not able to treat the MPTCP subflow bearers any differently than regular TCP bearers. This applies also for the "seamless session continuity at mobility" case.

SUMMARY

It is an objective of the present disclosure to improve handling of MPTCP subflows for reducing congestion in a communication network.

According to an aspect of the present disclosure, there is provided a method performed by a network element in a communication network. The method comprises inspecting traffic between a radio device and the communication network. The method also comprises, based on said inspecting, determining that the traffic is part of a TCP subflow of an MPTCP connection. The method also comprises, based on said inspecting, calculating a ratio of how much data is transmitted in the subflow in relation to the total amount of data transmitted in the MPTCP connection over a predetermined time period. The method also comprises observing that the calculated ratio is below a reference ratio. The method also comprises, based on said observing, performing an action for preventing congestion in the communication network.

According to another aspect of the present disclosure, there is provided a network element in a communication system. The network element comprises processor circuitry, and a storage unit storing instructions executable by said processor circuitry whereby said network element is operative to inspect traffic between a radio device and the communication network. The network element is also operative to, based on said inspecting, determine that the traffic is part of a Transmission Control Protocol (TCP) subflow of an MPTCP connection. The network element is also operative to, based on said inspecting, calculate a ratio of how much data is transmitted in the subflow in relation to the total amount of data transmitted in the MPTCP connection over a predetermined time period. The network element is also operative to observe that the calculated ratio is below a reference ratio. The network element is also operative to, based on said observing, perform an action for preventing congestion in the communication network According to another aspect of the present disclosure, there is provided a radio access network (RAN) node for a communication network, comprising an embodiment of the network element of the present disclosure.

According to another aspect of the present disclosure, there is provided a computer program product comprising computer-executable components for causing a network element in a communication network to perform an embodiment of the method of the present disclosure when the computer-executable components are run on processor circuitry comprised in the network element.

According to another aspect of the present disclosure, there is provided a computer program comprising computer program code which is able to, when run on processor circuitry of a network element, cause the network element to inspect traffic between a radio device and the communication network. The code is also able to cause the network element to, based on said inspecting, determine that the traffic is part of a TCP subflow of an MPTCP connection. The code is also able to cause the network element to, based on said inspecting, calculate a ratio of how much data is transmitted in the subflow in relation to the total amount of data transmitted in the MPTCP connection over a predetermined time period. The code is also able to cause the network element to observe that the calculated ratio is below a reference ratio. The code is also able to cause the network element to, based on said observing, perform an action for preventing congestion in the communication network.

According to another aspect of the present disclosure, there is provided a computer program product comprising an embodiment of a computer program of the present disclosure and a computer readable means on which the computer program is stored.

By means of the present disclosure, a communication network, e.g. a cellular communication network in accordance with a 3GPP standard, can take into consideration that TCP traffic in the communication network is over a subflow of an MPTCP connection between the radio device and a second host, when handling or preventing congestion in the network, e.g. in the RAN of said network. For instance, if the network element observes that the ratio of traffic in the MPTCP connection which passes through said network is small, the network may block the bearer (e.g. while allowing the radio device to stay connected to the network on UTRAN Routing Area (URA) level) carrying the subflow in order to free resources in the network with only small or no adverse impact for the MPTCP connection of the radio device, i.e. the MPTCP connection can likely be handled sufficiently by its other subflow(s).

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

MPTCP can, when implemented, be used to transfer TCP packets belonging to a single end user application using multiple paths to the client. The purpose may be improved performance, for example increased throughput or improved coverage. One very likely scenario is that one MPTCP subflow goes over Wi-Fi/WLAN and another MPTCP subflow over a 3GPP Radio Access Technology (RAT), or 3GPP2 RAT, for example Code Division Multiple Access (CDMA).

The present disclosure is mainly given in the context of actions taken in a 3GPP access, and also mainly related to actions taken in the Radio Network Controller (RNC) in the WCDMA/ High Speed Packet Access (HSPA) case. This is only to be seen as an example and same/similar actions can be taken on any access on which MPTCP is being used (e.g. both 3GPP and 3GPP2, and even on Wi-Fi side).

It is quite a common situation that a RAT is congested in at least some cells or areas, especially hotspots. On these occasions, the radio devices (clients) may experience a risk of being rejected at admission, and if admitted, the throughput may be low due to sharing the cell capacity with many other users, as well as that each radio device in connected mode in a 3GPP RAT consumes resources (mainly radio resources such as downlink power, codes and uplink noise raise) further reducing the resources available for transferring data.

It would therefore be beneficial for the end user performance in congested areas if the number of connected devices could be reduced by either admission reject or preemption. It may be even more beneficial if it is possible to, on top of Quality of Service (QoS) priority, select radio devices for reject/preemption where the benefit for the device of being in connected mode in the RAT is very low or even negligible. Embodiments of the present disclosure may be applicable both for 3GPP RATs and other RATs, it is however expected that clients in 3GPP RATs cause a higher overhead cost at no/limited traffic compared to non 3GPP RATs.

Existing technology would allow any MPTCP subflow to be transferred over a 3GPP RAT like any other packet data flow. The Congestion Handler in the 3GPP RAT cannot today, at admission or congestion, consider if a radio device is utilizing any more transmission paths and their ratio (using MPTCP) for the data transfer on the connection. Admission and preemption is therefore performed only based on Allocation and Retention Priority (ARP) and QoS attributes, however those are rarely used for subscription differentiation in today's networks. Neither may ARP or QoS attributes reflect the end user impact from a certain activity (like preemption). With today's solution it is not possible to differentiate admission and congestion handling in a network based on end user impact information when the user data is transferred over more than one path.

In accordance with some embodiments of the present disclosure, header inspection can be used to identify MPTCP packets for radio devices in a 3GPP network element (e.g. RNC). All, or a set of those MPTCP packets may be (per user or bearer) used to calculate a ratio between:
  the total number of bytes passing the 3GPP path (i.e. the particular MPTCP subflow), and
  the total number of bytes passing over the MPTCP connection.

The above ratio may, at congestion for one or more resources in the element, compared with a predefined threshold for each individual Radio Access Bearer, RAB, (or radio device). The predefined threshold defines if the MPTCP subflow data volume ratio going through the 3GPP node is small enough to allow the flow to be rejected at admission or be preempted when the cell/network suffers from congestion.

If the ratio is below the threshold, the RAB may be a first/early target for rejection or preemption.

Additionally, it may be possible to use header inspection to identify if a radio device also has non-MPTCP flows.

Figure 6:
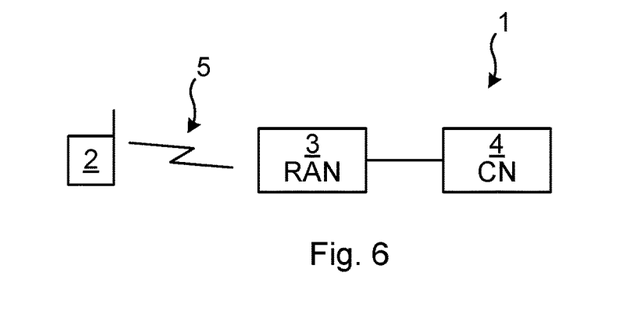
FIG. 6 is a schematic illustration of a communication network 1 in accordance with the present disclosure.

FIG. 6 schematically illustrates an embodiment of a communication network 1 in accordance with the present disclosure. A radio device 2 is connected to the communication network 1 via a radio access network (RAN) 3 of the communication network 1 by means of a radio access bearer (RAB) 5. The communication network 1 also comprises a core network (CN) 4 with which the radio device 2 may be in communication via the RAN 3. The radio device 2 may be any device or user equipment (UE), mobile or stationary, enabled to communicate over a radio channel in a communications network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). The RAN 3 may e.g. be in accordance with a Global System for Mobile Communications (GSM), Wideband Code Division Multiple Access (WCDMA) or Long Term Evolution (LTE) standard. At least one radio access bearer (RAB) 5 is set up between the radio device 2 and the RAN 3 in order to carry one or a plurality of different bearers with e.g. MPTCP and/or non-MPTCP TCP flows/subflows.

Figure 7:
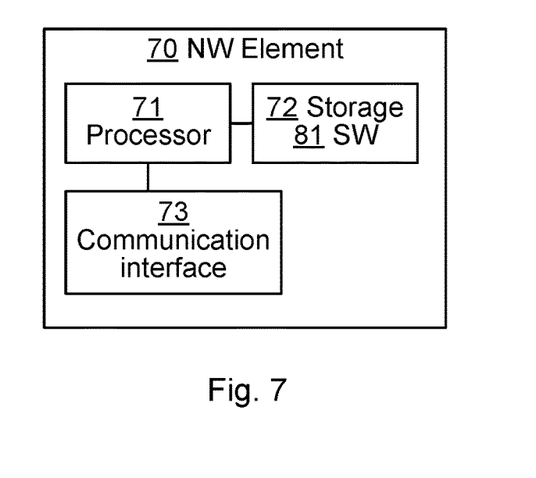
FIG. 7 is a schematic block diagram of an embodiment of a network element of the present disclosure.

FIG. 7 schematically illustrates an embodiment of a network (NW) element 70, e.g. comprised in a node in the RAN 3, such as in a Radio Network Controller (RNC) or evolved Node B (eNB), of the present disclosure. The NW element 70 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 81 stored in a storage 72 of one or several storage unit(s) e.g. a memory. The storage unit is regarded as a computer readable means as discussed herein and may e.g. be in the form of a Random Access Memory (RAM), a Flash memory or other solid state memory, or a hard disk, or be a combination thereof. The processor circuitry 71 may also be configured to store data in the storage 72, as needed. The NW element 70 also comprises a communication interface 73, typically including a transmitter and a receiver, which may be combined to form a transceiver or be present as distinct units within the NW element 70, for communication with other parts of the communication network 1. If the NW element 70 is comprised in a node of the communication network 1, the processor circuitry 71, the storage 72 as well as the communication interface 73 may be shared with other elements in said node.

Figure 8:
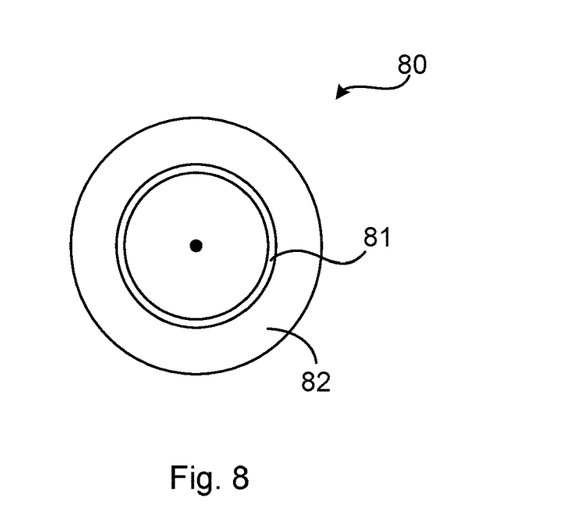
FIG. 8 schematically illustrates an embodiment of a computer program product of the present disclosure.

FIG. 8 illustrates a computer program product 80. The computer program product 80 comprises a computer readable medium 82 comprising a computer program or SW 81 in the form of computer-executable components 81. The computer program/computer-executable components 81 may be configured to cause a NW element 70, e.g. as discussed herein, to perform an embodiment of the method of the present disclosure. The computer program/computer-executable components may be run on the processor circuitry 71 of the element 70 for causing the element to perform the method. The computer program product 80 may e.g. be comprised in a storage unit or memory 72 comprised in the element 70 and associated with the processor circuitry 71. Alternatively, the computer program product 80 may be, or be part of, a separate, e.g. mobile, storage means, such as a computer readable disc, e.g. CD or DVD or hard disc/drive, or a solid state storage medium, e.g. a RAM or Flash memory.

Figure 9A:
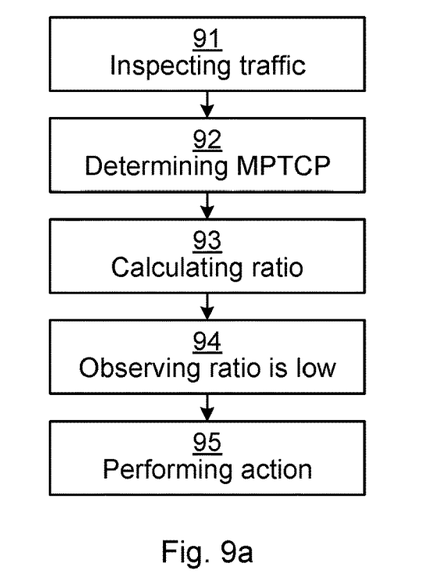
FIG. 9a is a schematic flow chart of an embodiment of a method of the present disclosure.

FIG. 9a is a schematic flow chart of an embodiment of the method of the present disclosure. The method is performed by a network element 70, e.g. in a RAN 3 node, in a communication network 1. Traffic between a radio device 2 and the communication network 1 is inspected 91. For instance, headers of data packets may be inspected in order to find information therein indicating that the packet is sent in a TCP subflow of an MPTCP connection and the ID or sequence number the packet has in both said subflow and said MPTCP connection. Thus, based on said inspecting 91, the network element determines 92 that the traffic is part of a TCP, subflow of an MPTCP connection. Also based on said inspecting 91, the network element 70 calculates 93 a ratio of how much data is transmitted in the subflow in relation to the total amount of data transmitted in the MPTCP connection over a predetermined time period, e.g. by means of the ID or sequence numbers of the packets sent through the network 1. Since the ID or sequence numbers of the packets of the MPTCP connection and the subflow which passes through the network 1 are known, the network element can know how many of the total number of packets in the flow are sent via the network 1. The ratio may be zero, if no data of the MPTCP connection is sent over the subflow, e.g. if the subflow is a backup path. Then, the network element 70 observes 94 that the calculated ratio is below a reference ratio. The reference ratio is predetermined and may be fixed or depend on the load/congestion of the network, e.g. the RAN 3. Based on said observing 94, the network element 70 performs 95 an action for preventing congestion in the communication network 1. Since the ratio is below the threshold, the subflow or the bearer of the subflow can be a suitable target for actions to prevent/reduce congestion (e.g. free up radio resources) in the network 1. Congestion may e.g. be due to too many radio devices being connected and having active RAB(s), or due to reduced amount of radio resources or power in the RAN 3 for some reason.

Figure 9B:
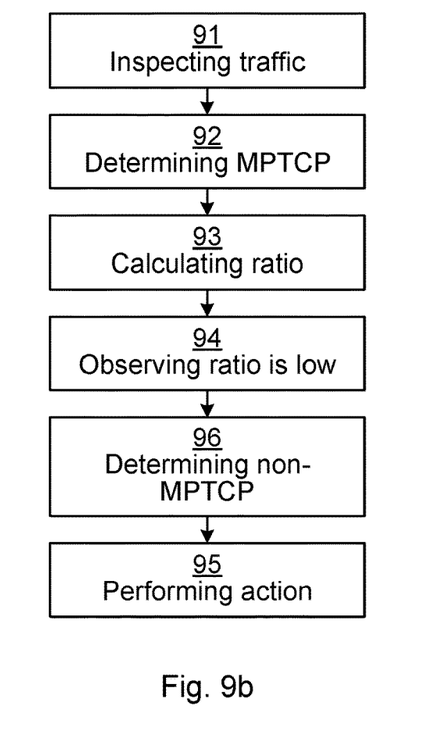
FIG. 9b is a schematic flow chart of another embodiment of a method of the present disclosure.

FIG. 9b is a schematic flow chart of another embodiment of the method of the present disclosure. The embodiment of FIG. 9b is as the embodiment of FIG. 9a, but with the addition that the network element also, based on said inspecting 91, determines 96 that an amount of non-MPTCP data traffic is also comprised in the inspected 91 traffic in the same radio access bearer (RAB) 5 which comprises the TCP subflow, over said time period. The observing 94 may then comprise observing that the amount of non-MPTCP data traffic is below a non-MPTCP threshold. If, on the other hand, the amount of non-MPTCP data is above the non-MPTCP threshold, the RAB 5 may be unsuitable for being targeted for reducing congestion since the non-MPTCP data may not be transmittable if the RAB 5 is e.g. preempted or its capacity reduced, which might adversely affect the radio device 2.

In some embodiments of the present disclosure, the performing 95 an action comprises preempting a RAB 5 of the radio device 2, e.g. the RAB carrying the MPTCP subflow with the inspected 91 traffic. Preempting may be done for example by releasing lower priority radio access bearers or radio devices when the related resources are needed for higher priority radio access bearers or radio devices. Preempting the RAB is one way of reducing or preventing congestion in the network 1.

In some other embodiments of the present disclosure, the performing 95 an action comprises rejecting resources to realise a RAB 5 of the radio device 2, for setting up the RAB with the communication network 1. Rejecting resources for setting up a bearer in the RAB 5/network 1 or for setting up the RAB is an alternative way of preventing congestion in the network 1. Thus, rejection of a RAB may comprise rejecting some of the lower layer resources used to realize the RAB.

In some other embodiments of the present disclosure, the performing 95 an action comprises assigning a priority level to a RAB 5 of the radio device 2. The priority level may then be used e.g. for pre-empting the RAB at a later stage for preventing congestion if needed. In case of congestion or risk of congestion, RABs having a lower priority may be pre-empted first, followed by RABs with higher priority and so on.

In some embodiments of the present disclosure, the inspecting 91 comprises inspecting headers, e.g. MPTCP headers, of data packets of the traffic. In some embodiments, the inspecting headers comprises inspecting Data Sequence Numbers (DSN) and Subflow Sequence Numbers (SSN) of the data packets. DSN may be explained as sequence numbers for the whole MPTCP connection, and SSN may be explained as sequence numbers for this specific TCP subflow of the MPTCP connection.

In some embodiments of the present disclosure, the inspecting 91 traffic comprises detection of MPTCP signalling indicative of a backup TCP subflow. Thus, the inspecting 91 may e.g. comprise detecting that the B-bit is set to "1" in a SYN flag in the MP_JOIN option (to establish a new TCP subflow for a MPTCP connection). The inspecting 91 may also comprise detecting a dynamic update of the B-bit for an established TCP subflow of an MPTCP connection in a MP_PRIO option. Alternatively, the calculating 93 a ratio may comprise calculating a ratio which is zero or close to zero, i.e. no data is sent on the subflow, which may indicate that the subflow is only used as backup path. It is here noted that if no data at all is sent, the network element 70 may not know how much data is sent on other subflows of the MPTCP connection but may still regard the ratio to be zero.

In some embodiments of the present disclosure, the reference ratio is a predetermined threshold, or a corresponding calculated ratio of another RAB. Thus, the ratio may be compared with a corresponding ratio of another RAB, e.g. another RAB currently used with the RAN 3, in order to set a priority of the TCP subflow in comparison with said other RAB 5.

In some embodiments of the present disclosure, the network element 70 is located in a RAN 3 in the communication network 1, such as in a base station controller (BSC) of a GSM communication network 1, in an RNC of a WCDMA communication network 1, or in an evolved Node B (eNB) of an LTE communication network 1. The RAN 3 is where the congestion information over the radio interface of the communication network may be known, why it may be a suitable location for the network element.

EXAMPLES

Embodiments of the present disclosure allow a 3GPP node, e.g. comprising the network element 70, to reject and/or preempt RABs/radio devices with MPTCP traffic based on the expected end user impact. An advantage is at congestion when RABs/radio devices can be rejected/preempted based on as discussed herein. This may result in that other RABs/radio devices will get a better performance as there are less RABs to share the total capacity with, as well as there are less overhead resources consumed thanks to the fewer number of RABs/radio devices. An alternative is to allow a high number of RABs/radio devices in the network 1 at congestion, but prioritize between them. The examples below illustrates specific embodiments of the present disclosure, and are also depicted in the flow chart of FIG. 10.

Example 1

Congestion Handling

Figure 10:
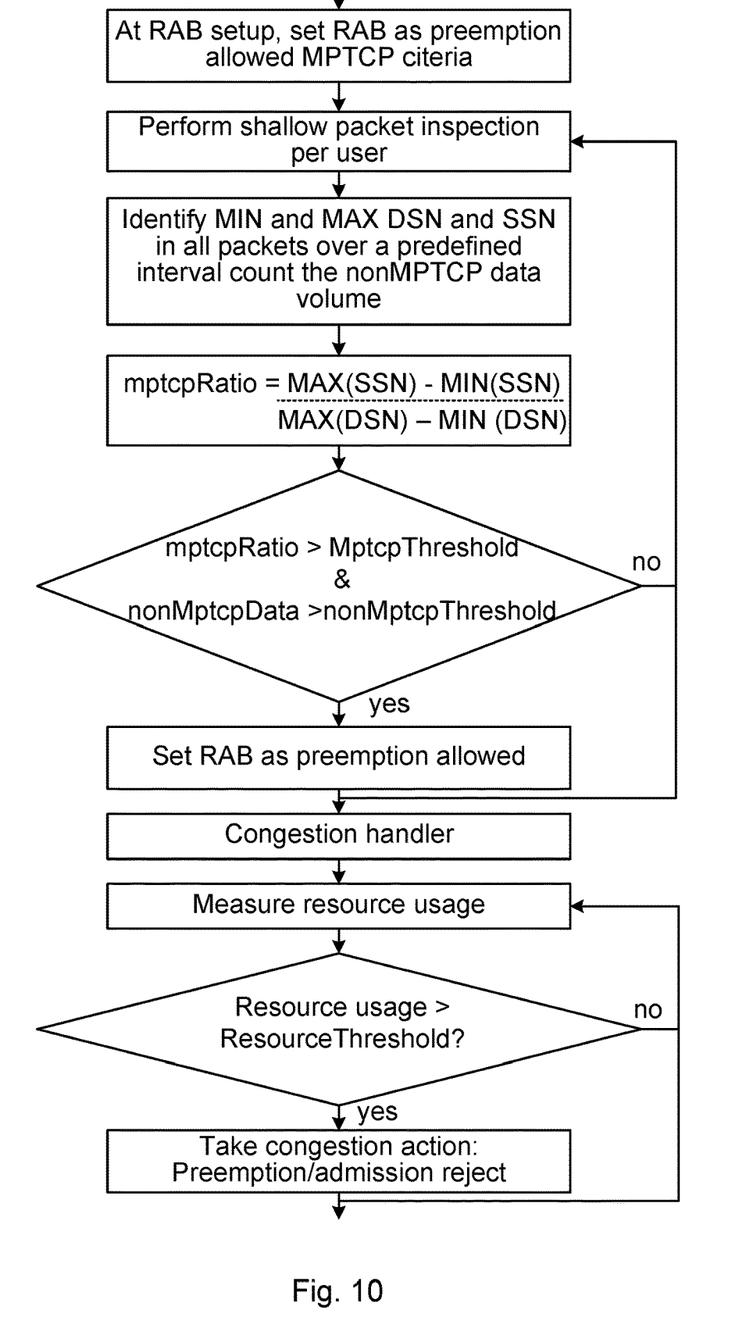
FIG. 10 is a schematic flow chart of an example embodiment of a method of the present disclosure.

When the RAB 5 is set up the traffic thereon can be monitored. A shallow packet inspection, e.g. inspection of the data packets that is limited to inspecting the data packet headers, for example TCP header fields such as TCP Option fields including MPTCP signalling, is performed 91 of the user data header (in this case on the TCP header options that include the MPTCP related information), and if MPTCP is identified 92, the packet is further analyzed in terms of Data Sequence Number (DSN) and Subflow Sequence Number (SSN). The measurements are performed over predefined intervals. Within each interval the minimum and maximum DSN and SSN are stored and used to calculate 93 the ratio of the MPTCP data flow transferred over this particular subflow.

It may also be possible to identify 96 if other non-MPTCP flows are transferred on the RAB 5. Such traffic volume can be summarized over the interval (nonMptcpData).

If the MPTCP ratio (MptcpRatio) is observed 94 to be below a predefined threshold (MptcpThreshold), and the volume of non-MPTCP data is below another predefined threshold (NonMptcpDataThreshold), the RAB 5 is identified as preemptable from the MPTCP criteria and marked as such in the Congestion Handler, e.g. in the network element 70 in a RAN node. The RABs may additionally or alternatively be priority ranked for preemption in the Congestion Handler, among others, based on for example MptcpRatio and nonMptcpData volume. The Congestion Handler process may then perform preemption of RABs when appropriate according to the ranking for preemption.

Example 2

Admission Handling

In addition or alternatively to the congestion handling it may be possible to provide input for the admission handling in CELL_FACH (forward access channel) and URA_PCH (URA paging channel). This may be performed as one of, or a combination of, two means. 1) performing measurements (step 91-92), calculations (step 93-94) and RAB marking of the ongoing traffic (step 95) according to above description. 2) when the traffic volume transferred is not enough to get reliable MptcpRatio and nonMptcpData values, the alternative may be to store the latest older values of MptcpRatio and nonMptcpData and utilize those values when a radio device 2 request an up-switch from CELL_FACH or URA_PCH.

Below follow another aspect of the present disclosure.

According to an aspect of the present disclosure, there is provided a network element 70 in a communication network 1. The network element comprises means (e.g. the processor circuitry 71 in cooperation with the communication interface 73 for inspecting 91 traffic between a radio device 2 and the communication network 1. The network element comprises means (e.g. the processor circuitry 71) for, based on said inspecting 91, determining 92 that the traffic is part of a TCP subflow of an MPTCP connection. The network element comprises means (e.g. the processor circuitry 71) for, based on said inspecting 91, calculating 93 a ratio of how much data is transmitted in the subflow in relation to the total amount of data transmitted in the MPTCP connection over a predetermined time period. The network element comprises means (e.g. the processor circuitry 71) for observing 94 that the calculated ratio is below a reference ratio. The network element comprises means (e.g. the processor circuitry 71 in cooperation with the communication interface 73) for, based on said observing 94, performing 95 an action for preventing congestion in the communication network 1.

The description herein is mainly given in the context of actions taken in a 3GPP access, and also mainly related to actions taken in the RNC in the WCDMA/HSPA case. This description is just to be seen as an example and same/similar actions can be taken on any access on which MPTCP is being used (e.g. both 3GPP and 3GPP2, and even on Wi-Fi side).

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a network element in a communication network, the method comprising:
   inspecting traffic between a radio device and the communication network; wherein said inspecting traffic comprises inspecting headers of data packets of the traffic; wherein said inspecting headers comprises inspecting data sequence number (DSN) and Subflow Sequence Numbers (SSN) of the data packets;

determining, based on said inspecting traffic, that the traffic is part of a Transmission Control Protocol (TCP) subflow of a multi-path TCP (MPTCP) connection;

calculating, based on said inspecting traffic, a ratio of how much data is transmitted in the subflow in relation to the total amount of data transmitted in the MPTCP connection over a predetermined time period;

observing that the calculated ratio is below a reference ratio, wherein the reference ratio is a corresponding calculated ratio of another radio access bearer (RAB), which is currently used with a Radio Access Network (RAN) to set a priority of the TOP subflow in comparison with said another RAB; and performing, based on said observing, an action for preventing congestion in the communication network; the performing an action comprises preempting a radio access bearer, (RAB) of the radio device, wherein said preempting is performed by releasing lower priority radio access bearers or radio devices when related resources are needed for higher priority radio access bearers or radio devices.

2. The method of claim 1, wherein the performing an action comprises rejecting resources to realize a radio access bearer (RAB) of the radio device for setting up the RAB with the communication network.

3. The method of claim 1, wherein the performing an action comprises assigning a priority level to a radio access bearer (RAB) of the radio device.

4. The method of claim 1, wherein the inspecting traffic comprises detection of MPTCP signalling indicative of a backup TCP subflow.

5. The method of claim 1, further comprising:
based on said inspecting, determining that also an amount of non-MPTCP data traffic is comprised in the inspected traffic in the same RAB which comprises the MPTCP subflow, over the time period;
wherein the observing comprises observing that the amount of non-MPTCP data traffic is below a non-MPTCP threshold.

6. The method of claim 1, wherein the network element is located in a radio access network (RAN) in the communication network, such as in a base station controller (BSC) of a Global System for Mobile Communications (GSM) communication network, in a radio network controller (RNC) of a Wideband Code Division Multiple Access (WCDMA) communication network, or in an evolved Node B (eNB) of a Long Term Evolution (LTE) communication network.

7. A computer program product comprising computer-executable components for causing a network element in a communication network to perform the method of claim 1 when the computer-executable components are run on processor circuitry comprised in the network element.

8. A network element in a communication network, the network element comprising:
processor circuitry; and
a storage unit storing instructions executable by said processor circuitry whereby said network element is operative to:
inspect traffic between a radio device and the communication network;
determine, based on said inspecting traffic, that the traffic is part of a Transmission Control Protocol (TCP) subflow of an MPTCP connection;
calculate, based on said inspecting traffic, a ratio of how much data is transmitted in the subflow in relation to the total amount of data transmitted in the MPTCP connection over a predetermined time period;
observe that the calculated ratio is below a reference ratio, wherein the reference ratio is a corresponding calculated ratio of another radio access bearer (RAB), which is currently used with a Radio Access Network (RAN) to set a priority of the TCP subflow in comparison with said another RAB; and
perform, based on said observing, an action for preventing congestion in the communication network; wherein said perform an action comprises preempting a radio access bearer of the radio device, and wherein said preempting is performed by releasing lower priority radio access bearers or radio devices when related resources are needed for higher priority radio access bearers or radio devices.

9. A radio access network (RAN) node for a communication network, comprising the network element of claim 8.

10. A non-transitory computer-readable medium comprising computer program code which is able to, when run on processor circuitry of a network element, cause the network element to:
inspect traffic between a radio device and the communication network;
determine, based on said inspecting traffic, that the traffic is part of a Transmission Control Protocol (TCP) subflow of an MPTCP connection;
calculate, based on said inspecting traffic, a ratio of how much data is transmitted in the subflow in relation to the total amount of data transmitted in the MPTCP connection over a predetermined time period;
observe that the calculated ratio is below a reference ratio; wherein the reference ratio is a corresponding calculated ratio of another radio access bearer (RAB), which is currently used with a Radio Access Network (RAN) to set a priority of the TCP subflow in comparison with said another RAB; and
perform, based on said observing, an action for preventing congestion in the communication network; wherein said perform an action comprises preempting a radio access bearer, (RAB) of the radio device, and wherein said preempting is performed by releasing lower priority radio access bearers or radio devices when related resources are needed for higher priority radio access bearers or radio devices.

* * * * *